(12) United States Patent
Dyson et al.

(10) Patent No.: US 11,326,470 B2
(45) Date of Patent: May 10, 2022

(54) CERAMIC MATRIX COMPOSITE COMPONENT INCLUDING COUNTERFLOW CHANNELS AND METHOD OF PRODUCING

(71) Applicant: General Electric Company, Schenectady, NY (US)

(72) Inventors: Thomas Earl Dyson, Niskayuna, NY (US); Douglas Glenn Decesare, Queensbury, NY (US); Changjie Sun, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 177 days.

(21) Appl. No.: 16/722,980

(22) Filed: Dec. 20, 2019

(65) Prior Publication Data

US 2021/0189901 A1 Jun. 24, 2021

(51) Int. Cl.
| | | |
|---|---|---|
| *F01D 25/00* | (2006.01) | |
| *C04B 35/80* | (2006.01) | |
| *C04B 38/06* | (2006.01) | |
| *F01D 5/14* | (2006.01) | |
| *F01D 9/02* | (2006.01) | |
| *F01D 25/24* | (2006.01) | |

(52) U.S. Cl.
CPC ............ *F01D 25/005* (2013.01); *C04B 35/80* (2013.01); *C04B 38/0615* (2013.01); *F01D 5/14* (2013.01); *F01D 9/02* (2013.01); *F01D 25/24* (2013.01); *F05D 2230/10* (2013.01)

(58) Field of Classification Search
CPC . F01D 25/005; F01D 5/14; F01D 9/02; F01D 25/24; F01D 11/04; F01D 11/005; F01D 11/08; C04B 35/80; C04B 38/0615; C04B 2237/80; C04B 2235/5212; C04B 38/065; F05D 2230/10; F05D 2260/205; F05D 2240/57; F05D 2300/6033; F05D 2240/11; F05D 2260/204; B32B 18/00
See application file for complete search history.

(56) References Cited

U.S. PATENT DOCUMENTS

| | | | |
|---|---|---|---|
| 6,627,019 B2 | 9/2003 | Jarmon et al. | |
| 7,186,360 B2 * | 3/2007 | Benitsch | ................. C04B 35/83 264/44 |
| 8,257,809 B2 * | 9/2012 | Morrison | ................ B32B 18/00 428/36.1 |
| 10,017,425 B2 | 7/2018 | Tuertscher et al. | |

(Continued)

*Primary Examiner* — Aaron R Eastman
(74) *Attorney, Agent, or Firm* — Dority & Manning, P.A.

(57) ABSTRACT

A ceramic matrix composite (CMC) component and method of fabrication including a plurality of counterflow elongated functional features. The CMC component includes a plurality of longitudinally extending ceramic matrix composite plies forming a densified body and a plurality of elongated functional features formed therein the densified body. Each of the plurality of functional features is configured longitudinally extending and in alignment with the plurality of ceramic matrix composite plies. Each of the plurality of elongated functional features includes an inlet configured in cross-ply configuration. The plurality of elongated functional features are configured to provide a flow of fluid from a fluid source to an exterior of the ceramic matrix composite component. The plurality of functional features are configured in alternating flow configuration.

20 Claims, 7 Drawing Sheets

(56) References Cited

U.S. PATENT DOCUMENTS

| | | | |
|---|---|---|---|
| 10,384,981 B2* | 8/2019 | Hall | C04B 35/584 |
| 10,590,776 B2 | 3/2020 | Dutta et al. | |
| 11,085,302 B2* | 8/2021 | Freeman | F01D 11/08 |
| 11,085,326 B2* | 8/2021 | Ishiguro | F01D 25/12 |
| 11,085,332 B2* | 8/2021 | Clark | F01D 11/08 |
| 2016/0060115 A1* | 3/2016 | La Forest | C04B 35/52 |
| | | | 427/227 |
| 2017/0350260 A1 | 12/2017 | Dutta et al. | |
| 2021/0095573 A1* | 4/2021 | Fernandez | F01D 11/12 |
| 2021/0199013 A1* | 7/2021 | Read | F01D 9/065 |

* cited by examiner

CERAMIC MATRIX COMPOSITE COMPONENT INCLUDING COUNTERFLOW CHANNELS AND METHOD OF PRODUCING

The present invention relates generally to gas turbines for power generation and more specifically to methods of forming ceramic matrix composite components for hot gas path turbine components for gas turbines.

BACKGROUND

Silicon carbide (SiC)-based ceramic matrix composite (CMC) materials have been proposed as materials for certain components of gas turbine engines, such as the turbine blades, vanes, nozzles, shrouds and buckets. Various methods are known for fabricating SiC-based components, including Silicomp, melt infiltration (MI), chemical vapor infiltration (CVI), polymer inflation pyrolysis (PIP), and oxide/oxide methods. Though these fabrication techniques significantly differ from each other, each involves the use of hand lay-up and tooling or dies to produce a near-net-shape part through a method that includes the application of heat at various method stages.

As with turbine blades and vanes formed from more conventional superalloy materials, CMC blades, vanes and shrouds are primarily equipped with cavities and cooling voids to reduce weight, reduce centrifugal load, and reduce operating temperatures of the components. These features are typically formed in CMC components using a combination of removable and expendable tooling, drilling or the like. Internal cooling channels are advantageous for cooling the both metal and CMC hot-gas path hardware as they reduce cooling flow requirements and thermal gradients/stress.

In many instances, the CMC gas turbine components are subject to extreme conditions in the form of extreme thermal gradients and high temperatures. Even with the inclusion of cavities and cooling voids in the CMC component as previously described, the extreme conditions may drive crack formation, coating spallation, and recession in the CMC components. Reduced service life from these problems prevents CMC components from realizing their full potential.

Accordingly, there is a need for a ceramic matrix composite component and method of producing a ceramic matrix composite component that provide improved cooling to the CMC gas turbine components when subject to extreme conditions, such as extreme thermal gradients and high temperatures.

BRIEF DESCRIPTION

Aspects and advantages of the disclosure will be set forth in part in the following description, or may be obvious from the description, or may be learned through practice of the disclosure.

A ceramic matrix composite (CMC) component is generally provided, along with a method of forming the component. In one embodiment, the ceramic matrix composite component includes a plurality of longitudinally extending ceramic matrix composite plies forming a densified body; and a plurality of elongated functional features formed therein the densified body. Each of the plurality of functional features is configured longitudinally extending and in alignment with the plurality of ceramic matrix composite plies. Each of the plurality of elongated functional features includes at least one of an inlet configured in cross-ply configuration and an outlet configured in cross-ply configuration. The plurality of elongated functional features are configured to provide a flow of fluid from a fluid source to an exterior of the ceramic matrix composite component. The plurality of functional features are configured in alternating flow configuration.

In an alternate embodiment, the ceramic matrix composite component includes a plurality of longitudinally extending ceramic matrix composite plies forming a densified body; a first plurality of cooling channels formed therein the densified body and defining an aft flowing fluid flow path from a fluid source to an exterior of the ceramic matrix composite component, a second plurality of cooling channels formed therein the densified body and defining a forward flowing fluid flow path from a fluid source to an exterior of the ceramic matrix composite component. Each of the first plurality of cooling channels is configured longitudinally extending, in alignment with the plurality of ceramic matrix composite plies, and having an inlet configured in cross-ply configuration. Each of the second plurality of cooling channels is configured longitudinally extending, in alignment with the plurality of ceramic matrix composite plies, having an inlet configured in cross-ply configuration. The first plurality of cooling channels and the second plurality of cooling channels are configured in alternating flow configuration.

In yet another embodiment, the method of forming a ceramic matrix composite (CMC) product includes forming a CMC preform comprising a matrix precursor, a plurality of reinforcing fibers and a plurality of sacrificial fibers; performing one of: removing the one or more sacrificial fibers such that a plurality of elongated functional features are formed along the CMC preform in a counterflow configuration; or applying a fluid infiltrant to the CMC preform thereby densifying the CMC preform, and performing the other of: removing the one or more sacrificial fibers such that a plurality of elongated functional features are formed along the CMC preform in a counterflow configuration; or applying a fluid infiltrant to the CMC preform thereby densifying the CMC preform.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended drawings, in which.

Wherever possible, the same reference numbers will be used throughout the drawings to represent the same parts.

DETAILED DESCRIPTION

Embodiments of the present disclosure, for example, in comparison to concepts failing to include one or more of the features disclosed herein, enable the formation of a plurality of counterflow cooling channels in a CMC component, wherein the channels are configured in alignment with the one or more CMC layers. The inclusion of the counterflow cooling channels in alignment with the one or more CMC layers provides for maintenance of the component structural integrity. The method, according to the present disclosure, has decreased complexity with low cost, and more efficient cooling that has the ability to reduce the cooling demand and flow-rate of the part When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, Hydrogen would be represented by its common chemical abbreviation H; Helium would be represented by its common chemical abbreviation He; and so forth.

As used herein, the "average particle diameter" or "average fiber diameter" refers to the diameter of a particle or fiber such that about 50% of the particles or fibers have a diameter that is greater than that diameter, and about 50% of the particles or fibers have a diameter that is less than that diameter.

As used herein, "substantially" refers to at least about 90% or more of the described group. For instance, as used herein, "substantially all" indicates that at least about 90% or more of the respective group have the applicable trait and "substantially no" or "substantially none" indicates that at least about 90% or more of the respective group do not have the applicable trait. As used herein, the "majority" refers to at least about 50% or more of the described group. For instance, as used herein, "the majority of" indicates that at least about 50% or more of the respective group have the applicable trait.

A ceramic matrix composite product (a "CMC product"), particularly a ceramic matrix composite product formed from melt infiltration, is generally provided herein, along with methods of forming such product. The CMC product is formed a plurality of ply layers including a plurality of elongated functional features configured in a counterflow arrangement for enhancing the function of the CMC, such a cooling channels in the CMC preform.

Systems used to generate power include, but are not limited to, gas turbines, steam turbines, and other turbine assemblies, such as land based aero-derivatives, used for power generation. In certain applications, the power generation systems, including the turbomachinery therein (e.g., turbines, compressors, and pumps) and other machinery, may include components that are exposed to heavy wear conditions. For example, certain power generation system components, such as blades, buckets, casings, rotor wheels, shafts, shrouds, nozzles, and so forth, may operate in high heat and/or high revolution environments. These components are manufactured using ceramic matrix composites and these components may also include cooling passages. The present disclosure provides a CMC component including a plurality of counter-flow cooling passages or channels, and a method of forming the ceramic matrix composite (CMC) components. An exemplary embodiment of the disclosure is shown in FIGS. 1-8 as a portion of a turbine shroud, but the present disclosure is not limited to the illustrated structure.

Figure 1:
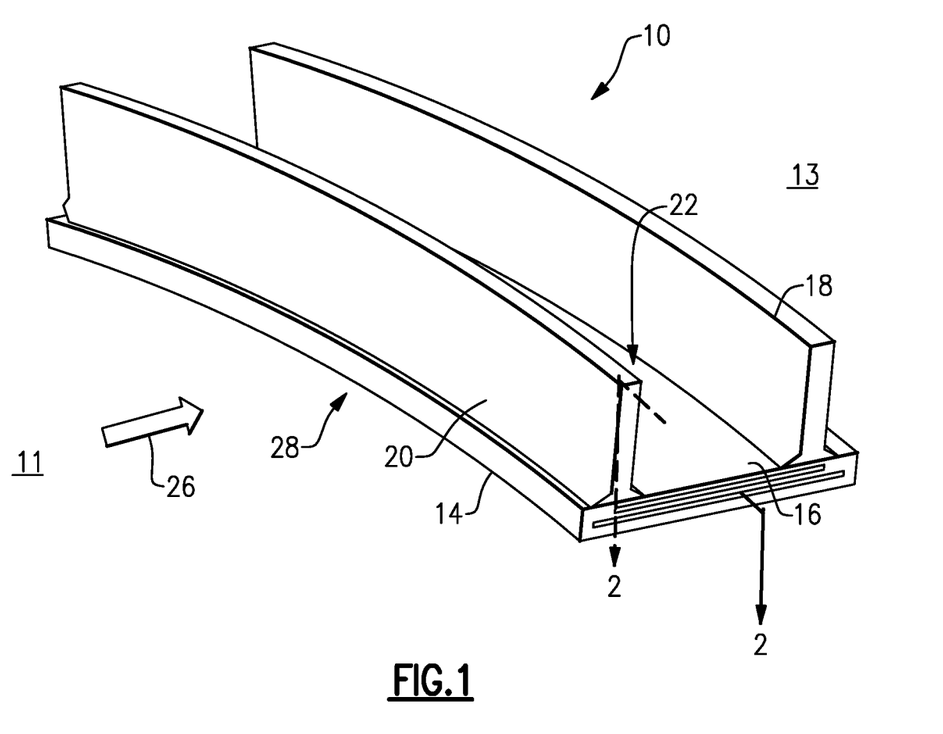
FIG. 1 is a perspective view of a ceramic matrix component (CMC), and more particularly, a portion of a CMC shroud, in accordance with one or more embodiments disclosed herein.

FIG. 1 is a perspective view of a component 10, such as, but not limited to, a segment of a turbine shroud. Although FIG. 1 shows a turbine shroud segment 12, other suitable components, according to the present disclosure, include, but are not limited to, a combustor liner, a blade, a nozzle, a nozzle end wall, a blade platform or other hot gas path component. Component 10 is preferably formed of a ceramic matrix composite (CMC) material. As used herein, ceramic matrix composite or "CMCs" refers to composites comprising a ceramic matrix reinforced by ceramic fibers. Some examples of CMCs acceptable for use herein can include, but are not limited to, materials having a matrix and reinforcing fibers comprising oxides, carbides, nitrides, oxycarbides, oxynitrides and mixtures thereof. Examples of non-oxide materials include, but are not limited to, CMCs with a silicon carbide matrix and silicon carbide fiber (when made by silicon melt infiltration, this matrix will contain residual free silicon); silicon carbide/silicon matrix mixture and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. Specifically, the oxide-oxide CMCs may be comprised of a matrix and reinforcing fibers comprising oxide-based materials such as aluminum oxide ($Al_2O_3$), silicon dioxide ($SiO_2$), aluminosilicates, and mixtures thereof. Accordingly, as used herein, the term "ceramic matrix composite" includes, but is not limited to, carbon-fiber-reinforced carbon (C/C), carbon-fiber-reinforced silicon carbide (C/SiC), and silicon-carbide-fiber-reinforced silicon carbide (SiC/SiC). In one embodiment, the ceramic matrix composite material has increased elongation, fracture toughness, thermal shock, and anisotropic properties as compared to a (non-reinforced) monolithic ceramic structure.

There are several methods that can be used to fabricate SiC-SiC CMCs. In one approach, the matrix is partially formed or densified through melt infiltration (MI) of molten silicon or silicon containing alloy into a CMC preform. In another approach, the matrix is at least partially formed through chemical vapor infiltration (CVI) of silicon carbide into a CMC preform. In a third approach, the matrix is at least partially formed by pyrolyzing a silicon carbide yielding pre-ceramic polymer. This method is often referred to as polymer infiltration and pyrolysis (PIP). Combinations of the above three techniques can also be used.

In one example of the MI CMC process, a boron-nitride based coating system is deposited on SiC fiber. The coated fiber is then impregnated with matrix precursor material in order to form prepreg tapes. One method of fabricating the tapes is filament winding. The fiber is drawn through a bath of matrix precursor slurry and the impregnated fiber wound on a drum. The matrix precursor may contain silicon carbide and or carbon particulates as well as organic materials. The impregnated fiber is then cut along the axis of the drum and is removed from the drum to yield a flat prepreg tape where the fibers are nominally running in the same direction. The resulting material is a unidirectional prepreg tape. The prepreg tapes can also be made using continuous prepregging machines or by other means. The tape can then be cut into shapes, laid up, and laminated to produce a preform. The preform is pyrolyzed, or burned out, in order to char any organic material from the matrix precursor and to create porosity. Molten silicon is then infiltrated into the porous preform, where it can react with carbon to form silicon carbide. Ideally, excess free silicon fills any remaining porosity and a dense composite is obtained. The matrix produced in this manner typically contains residual free silicon.

The prepreg MI process generates a material with a two-dimensional fiber architecture by stacking together multiple one-dimensional prepreg plies where the orientation of the fibers is varied between plies. Plies are often identified based on the orientation of the continuous fibers. A zero degree orientation is established, and other plies are designed based on the angle of their fibers with respect to the zero degree direction. Plies in which the fibers run perpendicular to the zero direction are known as 90 degree plies, cross plies, or transverse plies.

The MI approach can also be used with two-dimensional or three-dimensional woven architectures. An example of this approach would be the slurry-cast process, where the fiber is first woven into a three-dimensional preform or into a two-dimensional cloth. In the case of the cloth, layers of cloth are cut to shape and stacked up to create a preform. A chemical vapor infiltration (CVI) technique is used to deposit the interfacial coatings (typically boron nitride based or carbon based) onto the fibers. CVI can also be used to deposit a layer of silicon carbide matrix. The remaining portion of the matrix is formed by casting a matrix precursor slurry into the preform, and then infiltrating with molten silicon.

An alternative to the MI approach is to use the CVI technique to densify the Silicon Carbide matrix in one-dimensional, two-dimensional or three-dimensional architectures. Similarly, PIP can be used to densify the matrix of the composite. CVI and PIP generated matrices can be produced without excess free silicon. Combinations of MI, CVI, and PIP can also be used to densify the matrix.

A plurality of the shroud segments 12 (of which only a single shroud segment is illustrated) define the shroud structure and are arranged circumferentially and concentric with a rotor on which the turbine blades are mounted. Generally, the shroud is produced in a ring, segmented, and then provided for end use application as a set. As previously stated, the present disclosure is not intended to be limited to the particular shroud segment shown.

Each shroud segment 12 generally includes an arcuate shroud base 14 made up of a plurality of CMC plies (described presently) and having an axial component. A pair of upstanding ribs 18 and 20 are formed substantially perpendicular to the arcuate shroud base 14. The ribs 18, 20 act to support the arcuate shroud base 14, and in combination define cooling passages (described presently) in the shroud base 14 and chambers, e.g., a chamber 22. The ribs 18, 20, and any included optional flanges (not shown), serve to mount the shroud segments 12 within an engine casing and mounting structure. Additional cooling passages may be disposed in the ribs 18, 20. During operation of a power generation system, a flow of cooling air (not shown) is directed through the cooling passages in the shroud base 14 to reduce the temperature of the shroud segment 12.

Typically, in a gas turbine engine, a plurality of stationary shroud segments, generally similar to shroud segment 12, are assembled circumferentially about an axial flow engine axis and radially outwardly about rotating blading members, e.g., turbine blades, to define a part of the radial outer flow path boundary over the blades. In addition, the assembly of shroud segments is assembled in an engine axially between such axially adjacent engine members as nozzles and/or engine frames. The stationary shroud confines the combustion gases to the gas flow path so that the combustion gas is utilized with maximum efficiency to turn the gas turbine. Operating temperature of this flow path can be greater than 500° C. The shroud segment 12, which includes a surface 28 defining an inner diameter, is exposed to a hot flow gas path, as indicated by directional arrow 26 that flows directionally forward the shroud segment, generally referenced 11, to aft the shroud segment, generally referenced 13, through the figures.

Figure 2:
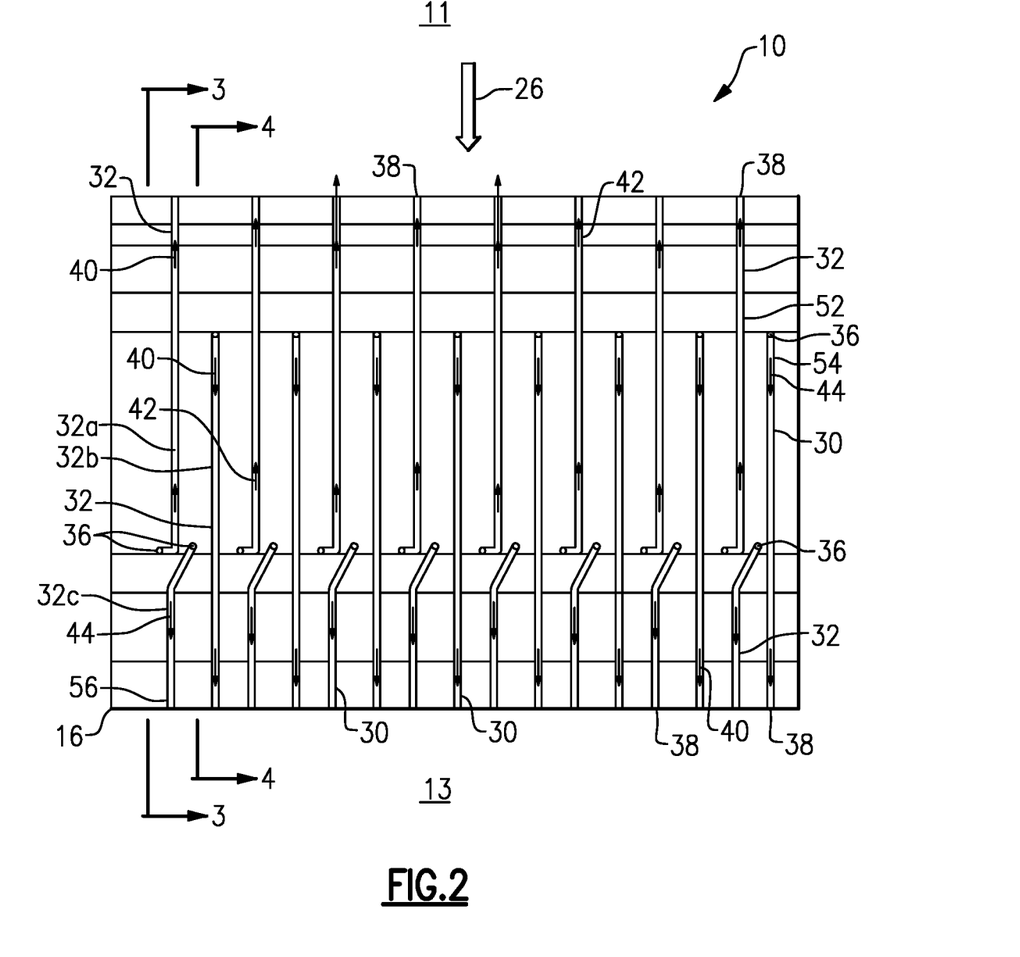
FIG. 2 is a sectional view of a portion of the shroud segment of FIG. 1, taken in direction 2-2 of FIG. 1, in accordance with one or more embodiments disclosed herein.
Figure 3:
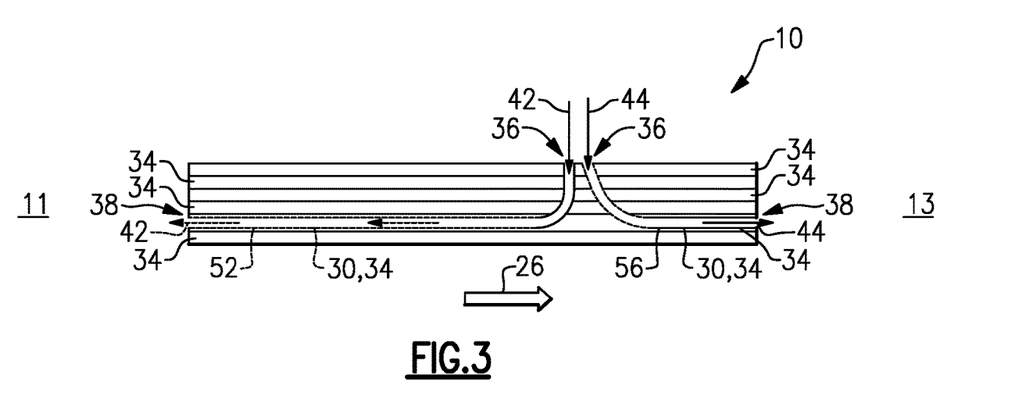
FIG. 3 is a sectional view taken in direction 3-3 of FIG. 2 of the ceramic matrix composite (CMC) component of FIG. 1, in accordance with one or more embodiments disclosed herein.
Figure 4:
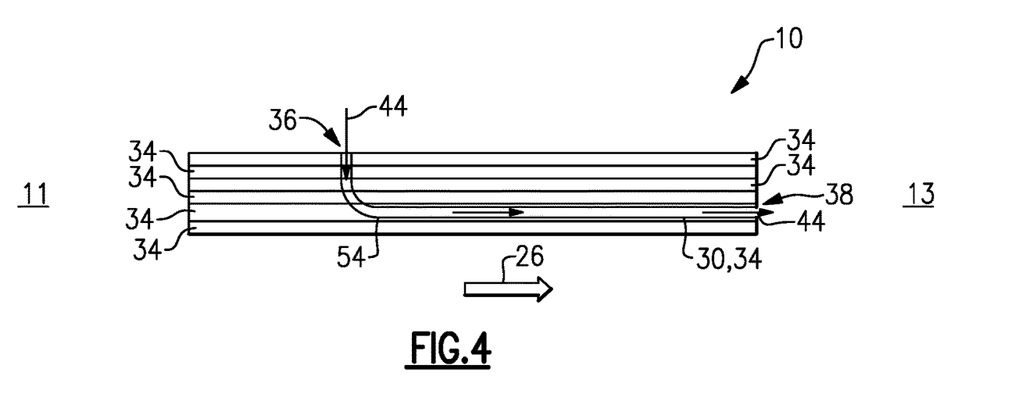
FIG. 4 is a sectional view taken in direction 4-4 of FIG. 2 of the ceramic matrix composite (CMC) component of FIG. 1, in accordance with one or more embodiments disclosed herein.

Referring now to FIGS. 2-4, illustrated are partial sectional views of the component 10 of FIG. 1. FIG. 2 is a partial sectional view of the component 10 taken in direction 2-2 of FIG. 1. FIG. 3 is a partial sectional view of the component 10 taken in direction 3-3 of FIG. 2. FIG. 4 is a partial sectional view of the component 10 taken in direction 4-4 of FIG. 2. Illustrated in FIGS. 2-4 are a plurality of elongated functional features 30, and more particularly a plurality of cooling channels 32 formed in the component 10. The plurality of elongated functional features 30 are defined within a CMC preform using a plurality of sacrificial fibers. Fabrication of elongated functional features using sacrificial fibers are discussed in commonly assigned, U.S.

Pat. No. 10,384,981, by D. Hall et al., and entitled "Methods of Forming Ceramic Matrix Composites Using Sacrificial Fibers and Related Products," which is incorporated herein in its entirety and U.S. patent application Ser. No. 16/722,896, filed simultaneously herewith, by D. Dunn et al., and entitled "Methods of Forming Ceramic Matrix Composites Using Sacrificial Fibers and Non-Wetting Coating", which is incorporated herein in its entirety.

As previously indicated, the component 10 is comprised of a plurality of ceramic matrix composite (CMC) plies 34 (FIGS. 3 and 4) of which only a few have been shown for clarity. As shown in FIG. 2, the functional features 30 are in fluid communication with the plenum (not shown) via a plurality of inlets (described presently) and an exterior the component 10 via a plurality of outlets (described presently). In an alternate embodiment, at least one of the plurality of functional features 30 may be in fluid communication with an alternative source of cooling fluid (not shown).

Referring more specifically to FIG. 2, illustrated are the plurality of functional features 30, and more particularly the plurality of cooling channels 32. Each of the plurality of cooling channels 32 includes and inlet 36 and an outlet 38. Each inlet 36 is in fluid communication with a source of cooling fluid, such as a plenum (not shown) or an alternative source. Each outlet 38 is in fluid communication with an exterior the component 10.

Within each cooling channel 32 flows a cooling fluid 40. As illustrated, the plurality of cooling channels 32 are configured in a counter-flow configuration to provide a forward flowing cooing fluid 42 and an aft flowing cooling fluid 44. More particularly, the cooling channels 32 are configured in an alternating configuration so that a cooling channel 32 including a forward flowing cooling fluid 42 is adjacent a cooling channel 32 including an aft flowing cooling fluid 44, thus cooling channels 32 that are positioned next to each other will have a cooling fluid flowing in opposite, or opposed, directions.

As illustrated in FIG. 2, the plurality of cooling channels 32 are configured including an inlet 36 for each of a first portion 32a of the plurality of cooling channels 32 having contained therein a forward flowing fluid 42. In addition, included is an inlet 36 for each of a second portion 32b of the plurality of cooling channels 32 having contained therein an aft flowing fluid 44. An inlet 36 for each of a third portion 32c of the plurality cooling channels 32 having contained therein an aft flowing fluid 44 is located near the inlet 36 of each of the first portion 32a of the plurality of cooling channels 32, such that fluid flow heat pick-up is shared between colder and warmer flowing fluids, producing a more even temperature field. In this particular embodiment, the plurality of cooling channels 32 are configured to include a plurality of long forward flowing fluid flowpaths 52 and a plurality of short aft flowing fluid flowpaths 56, as illustrated in FIG. 3, and a plurality of long aft flow fluid flowpath 54 as illustrated in FIG. 4.

As illustrated in FIGS. 3 and 4, each of the plurality of cooling channels 32 are configured in alignment with the plurality of ceramic matrix composite (CMC) plies 34 to maintain the structural integrity of the component 10.

Figure 5:
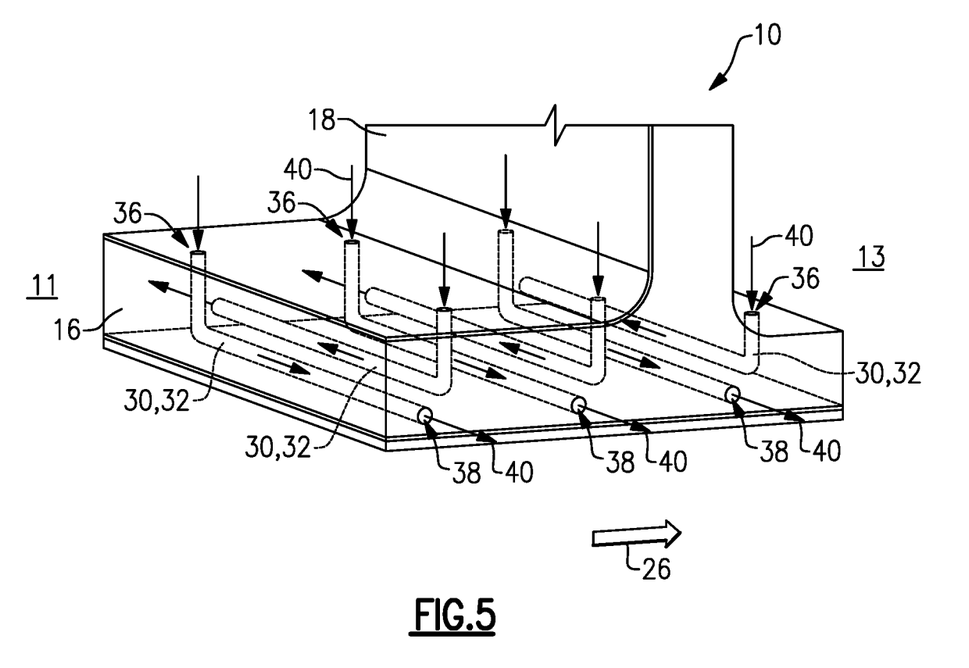
FIG. 5 is a schematic isometric view of a portion of another embodiment of a shroud segment, in accordance with one or more embodiments disclosed herein.

In the embodiment of FIGS. 2-4, the plurality of cooling channels are aligned with the hot gas flow 26. In an alternate embodiment, as illustrated in FIG. 5, wherein like numbers are utilized to reference the previously described elements, the plurality of functional features 30, and more particularly, the plurality of cooling channels 32 are aligned perpendicular to the hot gas flow 26. Orientation of the cooling channels 32 relative to the hot gas flow 26 is dependent on heat transfer need and external loads.

Figure 6:
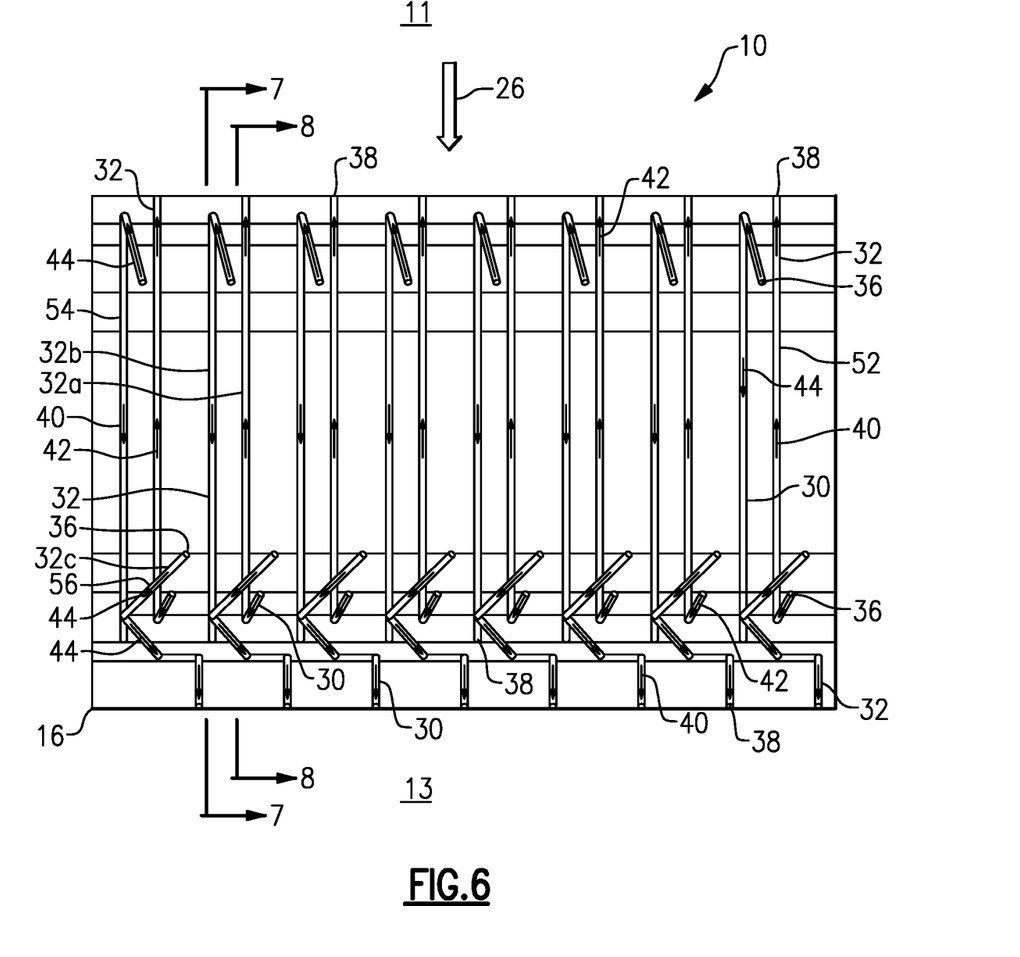
FIG. 6 is a sectional view of a portion of another embodiment of a shroud segment, in accordance with one or more embodiments disclosed herein.
Figure 7:
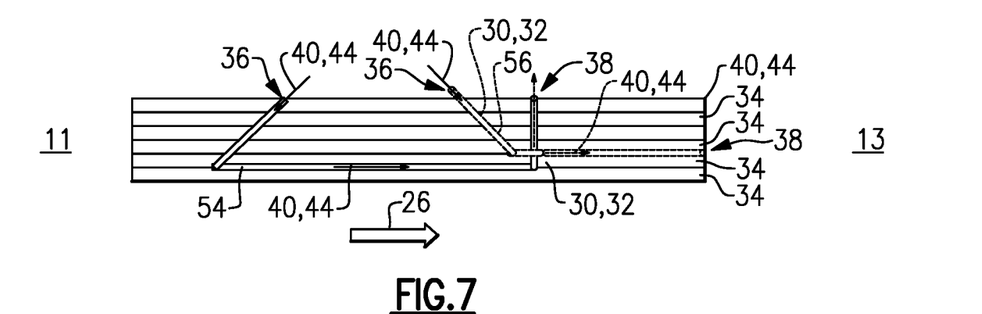
FIG. 7 is a sectional view taken in direction 7-7 of FIG. 6 of the ceramic matrix composite (CMC) component, in accordance with one or more embodiments disclosed herein.
Figure 8:
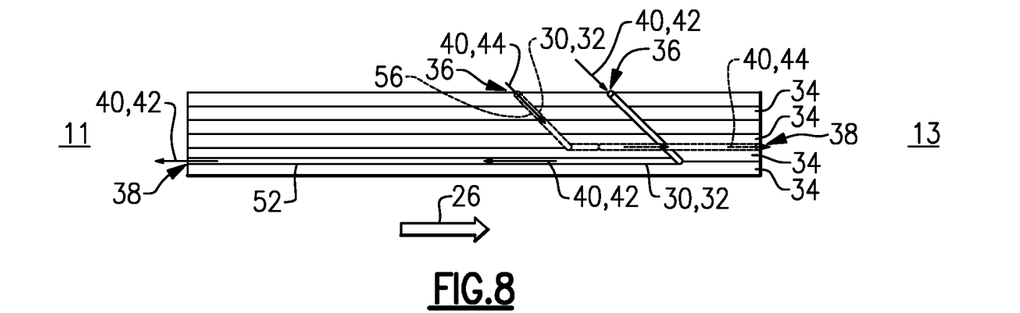
FIG. 8 is a sectional view taken in direction 8-8 of FIG. 6 of the ceramic matrix composite (CMC) component, in accordance with one or more embodiments disclosed herein.

Referring now to FIGS. 6-8, illustrated are partial sectional views of an alternate embodiment of a component 50, generally similar to the component 10 of FIG. 1. FIG. 6 is a partial sectional view of the component 50 taken in a same direction as FIG. 2 through a portion of a shroud segment. FIG. 7 is a partial sectional view of the component 50 taken in direction 7-7 of FIG. 6. FIG. 8 is a partial sectional view of the component 50 taken in direction 8-8 of FIG. 7. Unless otherwise indicated, the component 50 includes the same components identified during the description of the component 10 of FIGS. 2-4. Illustrated in FIGS. 6-8 are a plurality of elongated functional features 30, and more particularly a plurality of cooling channels 32 formed in the component 50. Similar to the component 10, the component 50 is comprised of a plurality of ceramic matrix composite (CMC) plies 34 (FIGS. 3 and 4) of which only a few have been shown for clarity. As shown in FIG. 6, the functional features 30 are in fluid communication with the plenum (not shown) via a plurality of inlets (described presently) and an exterior the component 10 via a plurality of outlets (described presently). In an alternate embodiment, at least one of the plurality of functional features 30 may be in fluid communication with an alternative source of cooling fluid (not shown).

Referring more specifically to FIG. 6, illustrated are the plurality of functional features 30, and more particularly the plurality of cooling channels 32. Each of the plurality of cooling channels 32 includes and inlet 36 and an outlet 38. Each inlet 36 is in fluid communication with a source of cooling fluid, such as a plenum (not shown) or an alternative source. Each outlet 38 is in fluid communication with an exterior the component 10.

Within each cooling channel 32 flows a cooling fluid 40. As illustrated, the plurality of cooling channels 32 are configured in a counter-flow configuration to provide a forward flowing cooling fluid 42 and an aft flowing cooling fluid 44. More particularly, the cooling channels 32 are configured in an alternating configuration so that a cooling channel 32 including a forward flowing cooling fluid 42 is adjacent a cooling channel 32 including an aft flowing cooling fluid 44, thus cooling channels 32 that are positioned next to each other will have a cooling fluid flowing in opposite, or opposed, directions.

As illustrated in FIG. 6, the plurality of cooling channels 32 are configured including an inlet 36 for each of a first portion 32a of the plurality of cooling channels 32 having contained therein a forward flowing fluid 42. In addition, included is an inlet 36 for each of a second portion 32b of the plurality of cooling channels 32 having contained therein an aft flowing fluid 44. An inlet 36 for each of a third portion 32c of the plurality cooling channels 32 having contained therein an aft flowing fluid 44 is located near the inlet 36 of each of the first portion 32a of the plurality of cooling channels 32, such that fluid flow heat pick-up is shared between colder and warmer flowing fluids, producing a more even temperature field. In this particular embodiment, the plurality of cooling channels 32 are configured to include a long aft flow fluid flowpath 54 as illustrated in FIG. 7, a long forward flowing fluid flowpath 52 as illustrated in FIG. 8, and a short aft flowing fluid flowpath 56, as illustrated in FIGS. 7 and 8. In contrast to the embodiment of FIGS. 2-4, in this particular embodiment the short aft flowing fluid flowpath 56 is configured having an "over-under" design and additional turns to increase length and pressure drop.

In the embodiment of FIGS. 6-8, the plurality of cooling channels are aligned with the hot gas flow 26. In an alternate embodiment, similar to FIG. 5, the plurality of functional features 30, and more particularly, the plurality of cooling channels 32 are aligned perpendicular to the hot gas flow 26, with orientation dependent on heat transfer need and external loads.

In the illustrated embodiments, the arrangement of ceramic matrix composite plies 34 and the cooling channels 32 are schematic and have been enlarged for illustration purposes. The size and geometry of the CMC plies 34 and voids, such as the cooling channels 32, are not limited to those shown in FIG. 2-8.

Figure 9:
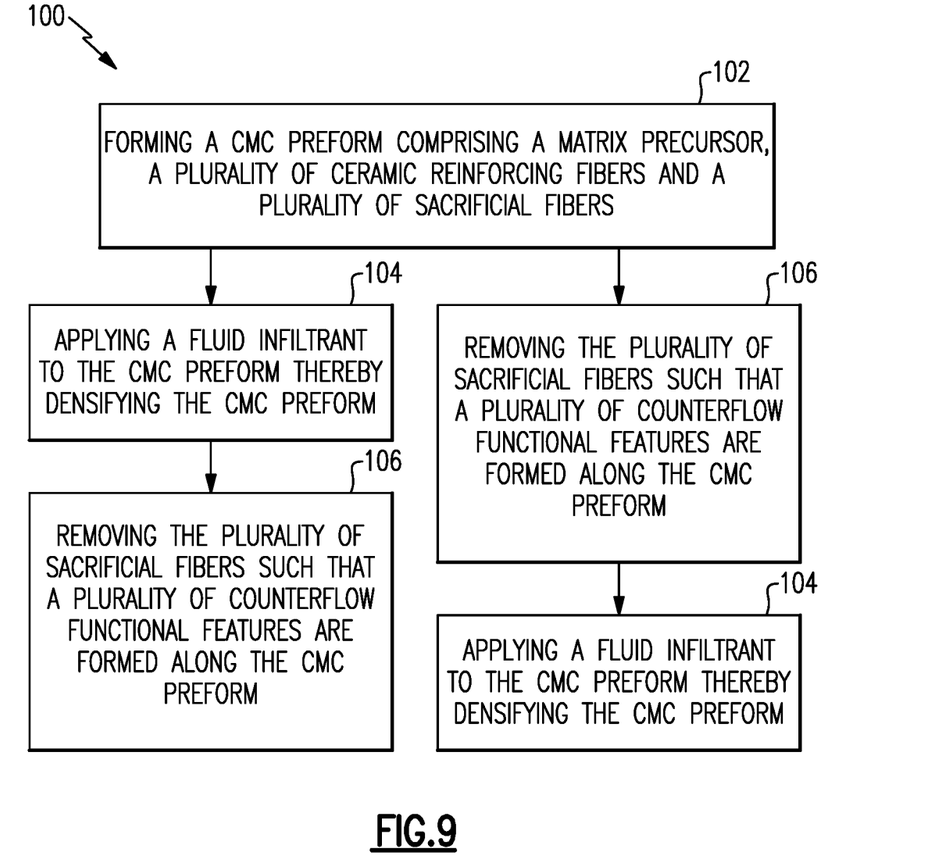
FIG. 9 schematically shows a method for forming a CMC component, in accordance with one or more embodiments disclosed herein.

FIG. 9 schematically shows a method 100 of forming the CMC component 10, 50 according to the present disclosure, having a plurality of elongated functional features 30 disposed therein, and more specifically, a plurality of counterflow cooling channels 32 (see also, FIGS. 2-8). Component 10, 50 is formed using a lay-up technique. Method 100 includes initially forming a CMC preform comprising a matrix precursor, a plurality of ceramic reinforcing fibers and a plurality of sacrificial fibers, in a step 102. Forming the CMC preform includes initially providing a ceramic matrix composite ply 34. The ceramic matrix composite ply 34 may be a single ply or a plurality of plies, such as a series of plies formed into a laminate stack. An example of material for plies 34 includes, but is not limited to, pre-preg composite plies including, for example, woven carbon fiber, binder material and coated SiC fibers, as previously described.

As previously described, the method, and more particularly step 102 of forming the CMC preform includes a means for defining a plurality of functional features therein, such as by using a plurality of sacrificial fibers. The sacrificial fibers enable the forming of the one or more elongated functional features 30 for enhancing the function of the CMC, such a plurality of counterflow cooling channels 32 in the CMC preform. The geometry of the functional features 36 defined therein the CMC preform includes any suitable geometry including a rounded, curved, elliptical, rectilinear or other suitable geometry.

Additional plies 34 are disposed to enclose the sacrificial fibers. The pre-form component is placed in an autoclave and an autoclave cycle is completed to form the CMC preform comprising the matrix precursor, the plurality of ceramic reinforcing fibers and the plurality of sacrificial fibers. The pre-form component is subject to typical autoclave pressures and temperature cycles used in the industry for ceramic composite materials. Autoclaving pulls out any volatiles remaining in the plies and autoclave conditions can be varied depending on the ply material. After autoclaving, a burn-out method is performed to remove any remaining material or additional binders in the pre-form component. The burn-out method is generally conducted at a temperature of approximately 426-648° C. (approximately 800-1200° F.).

After burn-out, the pre-form component is placed in a vacuum furnace for densification, in a step 104. Densification is performed using any known densification technique including, but not limited to, Silicomp, melt infiltration (MI), chemical vapor infiltration (CVI), polymer inflation pyrolysis (PIP), and oxide/oxide methods. Densification can be conducted in a vacuum furnace having an established atmosphere at temperatures above 1200° C. to allow Silicon or other infiltrant materials to melt-infiltrate into the pre-form component. One suitable method of densification is melt infiltration wherein molten matrix material is drawn into the plies 34 and permitted to solidify. After densification, the densified pre-form component or densified body includes the plurality of sacrificial fibers disposed therein, as shown in step 104, and forms at least a portion of the component 10, 50.

Subsequent to densification, the plurality of functional features 30 are further formed by removing the sacrificial fibers, to leave a plurality of elongated channels, defining the counterflow cooling channels 32, in a step 106. The removal of the sacrificial fibers to form the elongate channels is discussed in the above-referenced commonly assigned, U.S. Pat. No. 10,384,981 and U.S. patent application Ser. No. 16/722,896.

In an alternate embodiment, the plurality of functional features 30 are further formed by removing the plurality of sacrificial fibers, to leave a plurality of counterflow channels 32 prior to densification, as described in step 104.

In an embodiment, internal hollow portion of each of the plurality of functional features 30 is sufficiently large and open in the component 10, 50 such that coolant or other fluid can be directed therethrough to provide cooling to component 10, 50. However, the densified matrix material formed at the ceramic matrix composite ply 34 may form a blockage that substantially prevents flow of coolant or other fluids and more particularly, forms the functional features 30 as a closed structure that is internal to the component 10, 50. In an embodiment, openings are machined or otherwise formed into the component 10, 50 to provide inlets 36 and/or outlets 38 to each of the functional features 30 to permit flow therethrough.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A ceramic matrix composite component, comprising:
   a plurality of longitudinally extending ceramic matrix composite plies forming a densified body; and
   a plurality of elongated functional features formed therein the densified body,
   wherein each of the plurality of elongated functional features comprises a portion that is configured longitudinally extending and in alignment with the plurality of longitudinally extending ceramic matrix composite plies and is disposed between and directly adjacent to two adjacent plies of the plurality of longitudinally extending ceramic matrix composite plies,
   wherein each of the plurality of elongated functional features includes at least one of an inlet configured in cross-ply configuration and an outlet configured in cross-ply configuration, the plurality of elongated functional features configured to provide a flow of fluid from a fluid source to an exterior of the ceramic matrix composite component,
   wherein the plurality of elongated functional features are configured in alternating flow configuration.

2. The ceramic matrix composite component of claim 1, wherein the plurality of elongated functional features are enclosed within the densified body.

3. The ceramic matrix composite component of claim 1, wherein the plurality of elongated functional features comprise a plurality of counterflow cooling channels.

4. The ceramic matrix composite component of claim 3, wherein the plurality of counterflow cooling channels extend longitudinally from forward to aft relative to a hot gas path flow that the ceramic matrix composite component is exposed to.

5. The ceramic matrix composite component of claim 4, wherein the plurality of counterflow cooling channels define a plurality of forward flowing fluid flowpaths and a plurality of aft flowing fluid flowpaths in an alternating configuration.

6. The ceramic matrix composite component of claim 1, wherein a first portion of the plurality of elongated functional features include a forward flowing fluid contained therein, a second portion of the plurality of elongated functional features include an aft flowing fluid contained therein and a third portion of the plurality of elongated functional features include an aft flowing fluid contained therein,
wherein an inlet for the first portion of the plurality of elongated functional features is located proximate the inlet for the third portion of the plurality of elongated functional features such that fluid flow heat pick-up is shared between colder and warmer flowing fluids.

7. The ceramic matrix composite component of claim 1, wherein the ceramic matrix composite component is a hot gas path turbine component.

8. The ceramic matrix composite component of claim 7, wherein the hot gas path turbine component is selected from the group consisting of a combustor liner, a blade, a shroud, a nozzle, a nozzle end wall, and a blade platform.

9. The ceramic matrix composite component of claim 1, wherein the portion of each of the plurality of elongated functional features that is disposed between and directly adjacent to two adjacent plies of the plurality of longitudinally extending ceramic matrix composite plies is disposed between and contacts the two adjacent plies of the plurality of longitudinally extending ceramic matrix composite plies along an entire length of the portion.

10. A ceramic matrix composite component, comprising:
a plurality of longitudinally extending ceramic matrix composite plies forming a densified body;
a first plurality of cooling channels formed therein the densified body and defining an aft flowing fluid flowpath from a fluid source to an exterior of the ceramic matrix composite component, wherein each of the first plurality of cooling channels comprises a portion that is configured longitudinally extending, in alignment with the plurality of longitudinally extending ceramic matrix composite plies, and is disposed between and directly adjacent to two adjacent plies of the plurality of longitudinally extending ceramic matrix composite plies, and each of the first plurality of cooling channels having an inlet configured in cross-ply configuration; and
a second plurality of cooling channels formed therein the densified body and defining a forward flowing fluid flowpath from a fluid source to an exterior of the ceramic matrix composite component, wherein each of the second plurality of cooling channels comprises a portion that is configured longitudinally extending, in alignment with the plurality of longitudinally extending ceramic matrix composite plies, and is disposed between and directly adjacent to two adjacent plies of the plurality of longitudinally extending ceramic matrix composite plies, having an inlet configured in cross-ply configuration,
wherein the first plurality of cooling channels and the second plurality of cooling channels are configured in alternating flow configuration.

11. The ceramic matrix composite component of claim 10, wherein the first plurality of cooling channels and the second plurality of cooling channels are enclosed within the densified body.

12. The ceramic matrix composite component of claim 10, wherein each of the first plurality of cooling channels and the second plurality of cooling channels further includes a fluid outlet.

13. The ceramic matrix composite component of claim 10, wherein a first portion of the first plurality of cooling channels includes a forward flowing fluid contained therein, a second portion of the second plurality of cooling channels includes an aft flowing fluid contained therein and a third portion of the second plurality of cooling channels includes an aft flowing fluid contained therein, wherein an inlet for the first portion of the first plurality of cooling channels is located proximate the inlet for the third portion of the second plurality of cooling channels such that fluid flow heat pick-up is shared between colder and warmer flowing fluids.

14. The ceramic matrix composite component of claim 10, wherein the ceramic matrix composite component is a hot gas path turbine component.

15. The ceramic matrix composite component of claim 14, wherein the hot gas path turbine component is selected from the group consisting of a combustor liner, a blade, a shroud, a nozzle, a nozzle end wall, and a blade platform.

16. The ceramic matrix composite component of claim 10, wherein the portion of the first plurality of cooling channels that is disposed between and directly adjacent to two adjacent plies of the plurality of longitudinally extending ceramic matrix composite plies is disposed between and contacts the two adjacent plies of the plurality of longitudinally extending ceramic matrix composite plies.

17. A method of forming a ceramic matrix composite (CMC) product the method comprising:
forming a CMC preform comprising a matrix precursor, a plurality of longitudinally extending reinforcing fibers, and a plurality of sacrificial fibers, wherein each of the plurality of longitudinally extending sacrificial fibers has a portion that is disposed between and directly adjacent to two adjacent reinforcing fibers of the plurality of longitudinally extending reinforcing fibers;
performing one of:
removing the plurality of sacrificial fibers such that a plurality of elongated functional features are formed along the CMC preform in a counterflow configuration; or
applying a fluid infiltrant to the CMC preform thereby densifying the CMC preform, and
performing the other of:
removing the plurality of sacrificial fibers such that a plurality of elongated functional features are formed along the CMC preform in a counterflow configuration; or
applying a fluid infiltrant to the CMC preform thereby densifying the CMC preform.

18. The method according to claim 17, wherein the plurality of elongated functional features comprise a plurality of counterflow cooling channels.

19. The method according to claim 18, wherein the plurality of counterflow cooling channels define a plurality of forward flowing fluid flowpaths and a plurality of aft flowing fluid flowpaths in an alternating configuration.

20. The method according to claim 17, wherein the CMC product is a hot gas path turbine component.

* * * * *